No. 704,403.  
P. THILL.  
Patented July 8, 1902.
ADJUSTABLE SUPPORT FOR PHOTOGRAPHIC OR SIMILAR APPARATUS.
(Application filed Aug. 9, 1901.)
(No Model.)
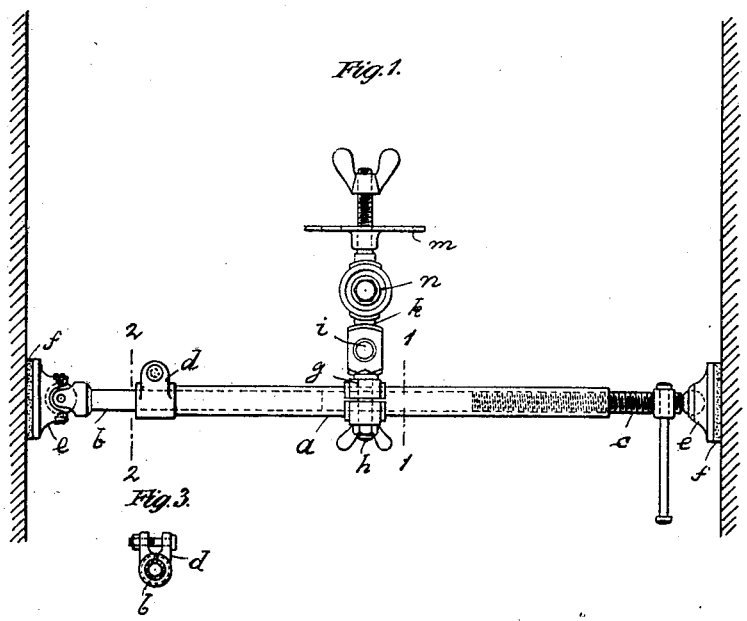
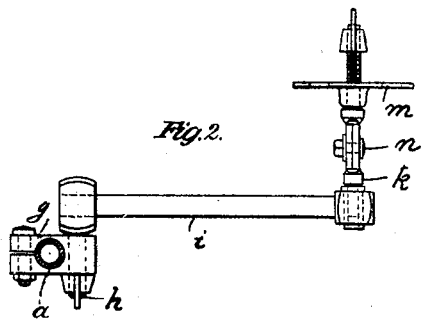

UNITED STATES PATENT OFFICE.

PETER THILL, OF OHLIGS, GERMANY.

ADJUSTABLE SUPPORT FOR PHOTOGRAPHIC OR SIMILAR APPARATUS.

SPECIFICATION forming part of Letters Patent No. 704,403, dated July 8, 1902.

Application filed August 9, 1901. Serial No. 71,487. (No model.)

*To all whom it may concern:*

Be it known that I, PETER THILL, a subject of the King of Prussia, German Emperor, and a resident of Ohligs, in the Kingdom of Prussia, Germany, have invented certain new and useful Improvements in Adjustable Supports for Photographic or Similar Apparatus, (for which I have obtained Letters Patent in Germany, No. 122,846, dated January 11, 1901, and in France, No. 308,456, dated February 25, 1901,) of which the following is a specification.

My invention relates to an improved support for photographic and other optical apparatus; and the object of my invention is to provide a support which allows of adjusting said support between the two sides of a window-embrasure or of a door and of directing the object-glass of the apparatus in every desired direction—upward, downward, and to the sides—without being limited in the scope of view by the said embrasure.

In the accompanying drawings, Figure 1 is a front elevation of the support adjusted between the two straight sides of a window-embrasure. Fig. 2 is a cross-section drawn to line 1 1, and Fig. 3 is a cross-section drawn to line 2 2, of Fig. 1.

The support of my invention consists of a rod $a$, preferably hollow, and which may consist of a metal tube. To secure said rod between the two sides of an embrasure in a horizontal or oblique position, the length of said rod ought to be adjustable at one or both ends, the adjustability being obtained by rods $b$ and $c$ of a smaller diameter arranged to slide or work within the rod $a$. In the drawings the left-hand adjustable rod $b$ is a sliding rod, and in this case the rod $a$ is slotted, and the slotted end may be compressed by a clamp $d$ to adjust the rod $b$ in the desired position. The right-hand adjustable rod $c$ is shown screw-threaded and working within a female screw of the rod $a$. While I have shown a specific form of adjustably securing the extensions to the rod and the pads to the extensions, it will be readily understood that these may be varied mechanically without departing from the spirit of my invention as long as such changes may fall within the scope of the appended claims. The outside ends of said adjustable rods $b$ and $c$ are provided with pads $e$, preferably lined with rubber $f$ or other elastic material, which pads are forced against the sides of the window-embrasure without injuring the same. The said pads $e$ are jointed to the ends of the adjusting-rods $b$ and $c$, and the joints may be ball-and-socket joints, as shown at the right side of Fig. 1, or they may be universal joints, as shown at the left of Fig. 1. It will be seen that by the aid of said jointed pads $b$ and $c$ the rod $a$ may be secured between the two sides of the embrasure in any desired inclined position, as well as in the horizontal position shown in Fig. 1, or if the window-embrasure is a circular one or of oval or other shape the jointed pads $b$ and $c$ will as well allow of adjusting the rod in any desired position.

The main rod $a$ carries a sliding ferrule-clamp $g$, adjustable as well in the longitudinal direction of the rod $a$ as also in the vertical plane. The ferrule-clamp carries an adjustable pivot $h$, and from the said pivot $h$ extends an arm $i$, the free end of which has a bearing formed to it, within which turns an upright arm $k$, to which the supporting-plate $m$ of the photographic or other optical apparatus or instrument is jointed, as at $n$.

It will be seen that owing to the adjustability of the rod $a$ between the sides of the embrasure in any desired oblique or in the horizontal position and owing to the facility of turning the pivot $h$ in a circle of the horizontal plane, as also of adjusting the supporting-plate $m$ in any inclined position, the apparatus or instrument may be easily directed upward, downward, and toward any side. The construction described with reference to the use of the arm $i$ secures a wider range for changing positions, and in adjusting the arm $i$ in a position extending from the window-embrasure the apparatus on its support $m$ will actually be placed outside of the window-embrasure, and its range will be still further extended.

I claim as my invention—

1. A support for photographic and other apparatus or instruments comprising a rod carrying adjusting devices for securing it between two fixed surfaces; and a holder for the apparatus adjustable laterally and circumferentially on said rod and means for clamping said holder on said rod.

2. A support for photographic and other apparatus or instruments comprising a rod having adjustable devices at the ends thereof to permit of a securing thereof between two surfaces at varying angles; and a holder for the apparatus adjustable laterally and circumferentially on said support and means for clamping said holder on said rod.

3. A support for photographic and other apparatus or instruments comprising a rod; extensions adjustably located at the ends thereof; and pads jointed to said extensions, whereby the rod may be fixedly mounted at varying angles between two surfaces.

4. A support for photographic and other apparatus or instruments comprising a rod; extensions adjustably located at the ends thereof; pads jointed to said extensions, whereby the rod may be fixedly mounted at varying angles between two surfaces; and a holder for the apparatus adjustable laterally and circumferentially on said support.

5. A support for photographic and other apparatus or instruments comprising a rod; extensions adjustably located at the ends thereof; pads jointed to said extensions, whereby the rod may be fixedly mounted at varying angles between two surfaces; and a holder for the apparatus adjustable laterally and circumferentially on said support, said holder being offset from the axis of said support.

6. A support for photographic and other apparatus or instruments comprising a rod; extensions adjustably located at the ends thereof; pads jointed to said extensions, whereby the rod may be fixedly mounted at varying angles between two surfaces; a holder for the apparatus adjustable laterally and circumferentially on said support, said holder being offset from the axis of said support; and a plate pivotally carried by said holder.

In witness whereof I have hereunto set my hand in presence of two witnesses.

PETER THILL.

Witnesses:
ERNST KATZ,
E. Z. BRODOWSKI.